(12) United States Patent
Salen

(10) Patent No.: US 8,832,977 B1
(45) Date of Patent: Sep. 16, 2014

(54) CUSTOMIZABLE LICENSE PLATELINES

(71) Applicant: Yolanda Salen, Colonia, NJ (US)

(72) Inventor: Yolanda Salen, Colonia, NJ (US)

( * ) Notice: Subject to any disclaimer, the term of this patent is extended or adjusted under 35 U.S.C. 154(b) by 0 days.

(21) Appl. No.: 13/890,224

(22) Filed: May 8, 2013

(51) Int. Cl.
G09F 7/00 (2006.01)
B60R 13/10 (2006.01)

(52) U.S. Cl.
CPC ................. B60R 13/105 (2013.01)
USPC ............................. 40/209; 40/210

(58) Field of Classification Search
USPC .................................... 40/209, 210
See application file for complete search history.

(56) References Cited

U.S. PATENT DOCUMENTS

| | | | | |
|---|---|---|---|---|
| 1,787,545 A * | 1/1931 | Orester et al. | ................ | 40/202 |
| 1,864,641 A * | 6/1932 | Davis | ................ | 40/209 |
| 2,129,149 A * | 9/1938 | Patton | ................ | 40/209 |
| 2,135,191 A * | 11/1938 | McBrady | ................ | 40/210 |
| 4,707,939 A * | 11/1987 | Bonner et al. | ................ | 40/591 |
| 4,924,611 A * | 5/1990 | Shaw | ................ | 40/210 |
| 5,815,965 A * | 10/1998 | de Greeve | ................ | 40/209 |
| 7,350,323 B1 * | 4/2008 | Basos | ................ | 40/209 |
| 2005/0210720 A1 * | 9/2005 | Burr et al. | ................ | 40/209 |

* cited by examiner

*Primary Examiner* — Gary Hoge
(74) *Attorney, Agent, or Firm* — Oakwood Law Group, LLP; Stephen Liu

(57) ABSTRACT

The present invention describes a customizable license plate holder. The device comprises a conventional license plate holder with an opening on the top and bottom, which enables a personalized message bar to be attached. The message bar can display a favorite quote, name of a sports team or team logos, or advertisements that marketers have requested or paid drivers to display. The message bar is inserted into the open slot from the top, and is secured by an arch at the back of the holder. The present invention can provide users with a fun and convenient way to display messages on their car's license plate holder. The device can allow people to personalize their vehicles without having to adhere a permanent bumper sticker.

1 Claim, 6 Drawing Sheets

US 8,832,977 B1

CUSTOMIZABLE LICENSE PLATELINES

REFERENCE TO RELATED APPLICATIONS

This patent application claims the benefit of U.S. Provisional Application No. 61/644,276 filed on May 8, 2012, the disclosure of which is incorporated herein by reference in its entirety.

BACKGROUND OF THE INVENTION

1. Field of the Invention

The present invention relates to a license plate holder. More particularly, the present invention pertains to a customizable license plate holder.

2. Description of Related Art

Many people like to personalize their cars with quotes, sayings, or sports team logos. Most bumper stickers, however, are either permanent or can be extremely difficult to peel off. This can be problematic if someone works for a company and is displaying his or her sticker, and then decides to switch jobs or gets fired. Often times, people end up simply covering up the bumper sticker with another one, which may not be the best solution. Not only do people use bumper stickers, they also purchase license plate frame holders that already have a sports team name, a favorite brand name, car model, or other information printed on top or bottom areas of the license plate frame. Additionally, advertisers are always looking for a new and creative way to display their products.

Therefore, an effective solution is necessary.

SUMMARY OF THE INVENTION

The present invention describes a customizable license plate holder and personalized message bar. The device comprises a conventional license plate holder with an opening on the top and bottom, which enables a personalized message bar to be attached. The message bar can display a favorite quote, name of a sports team or team logos, or advertisements that marketers have requested or paid drivers to display. The message bar is inserted into the open slot from the top, and is secured by an arch at the back of the holder. The present invention can provide users with a fun and convenient way to display messages on their car's license plate holder. The device can allow people to personalize their vehicles without having to adhere to a permanent bumper sticker.

Said device can be formed to have an option wherein a top and bottom holder (either both or one or the other) can be used in a way which allows for them to be secured by side inserts to a frame or even without a frame as a standalone top or bottom that will have attached holes for a screw so that said device can be screwed together with the license plates themselves.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
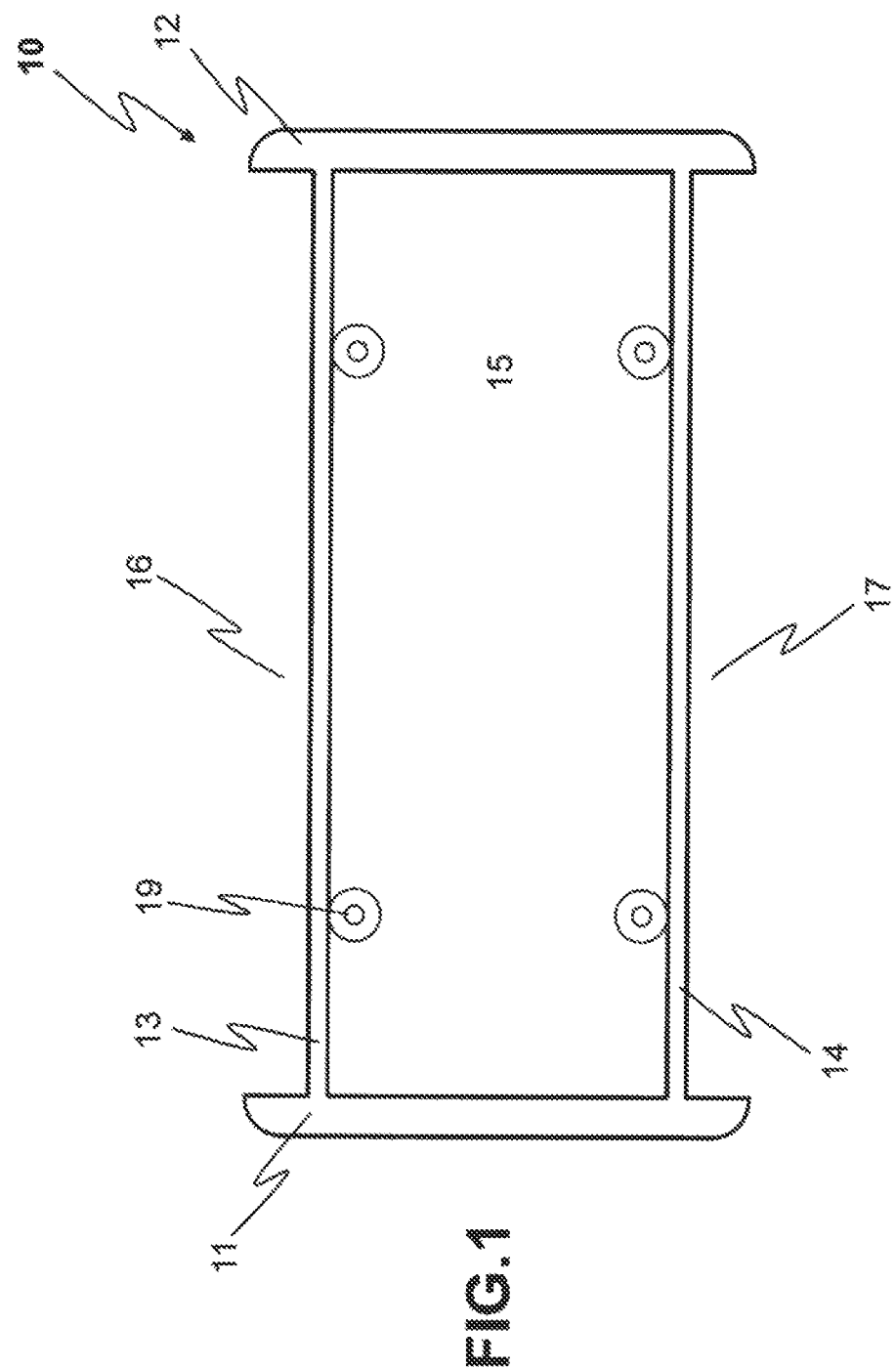
FIG. 1 is a front view of a license plate holder according to one embodiment of the present invention.
Figure 2:
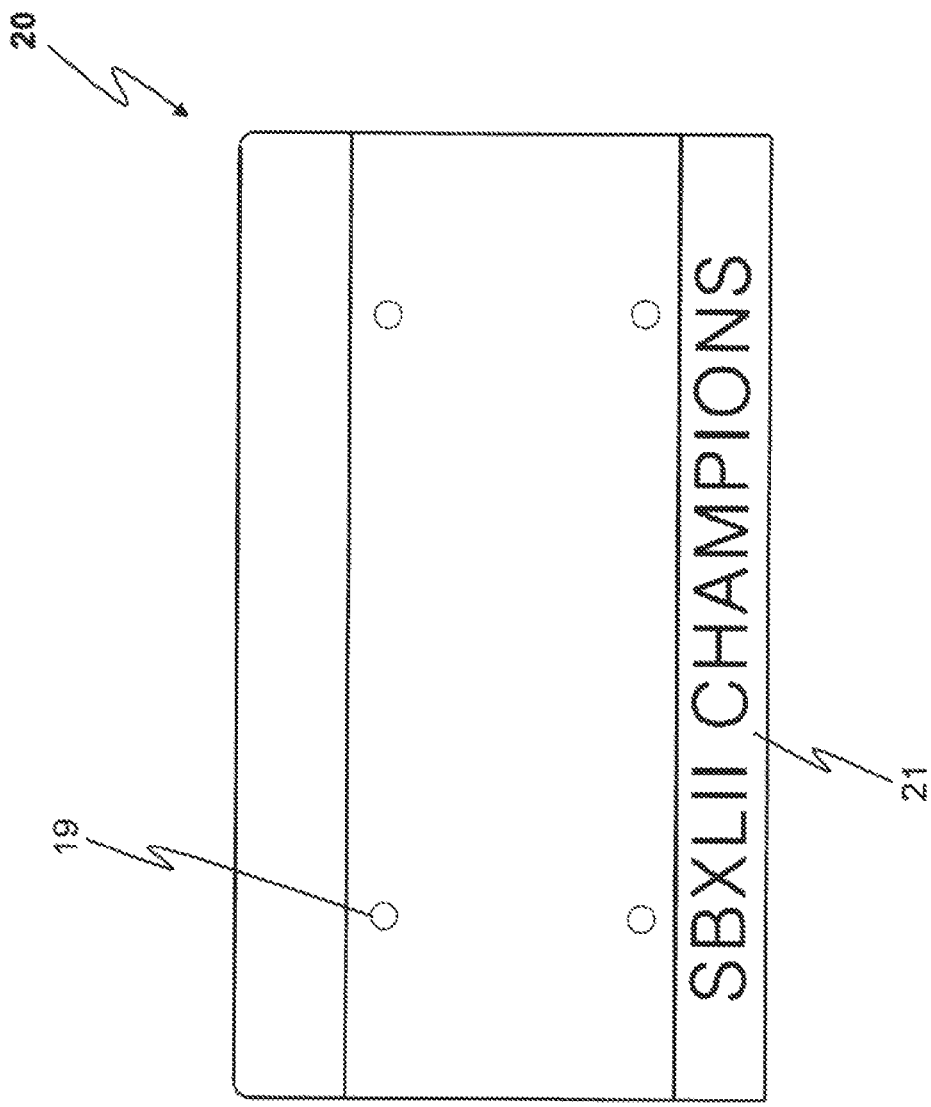
FIG. 2 is a front view of a message bar.
Figure 3:
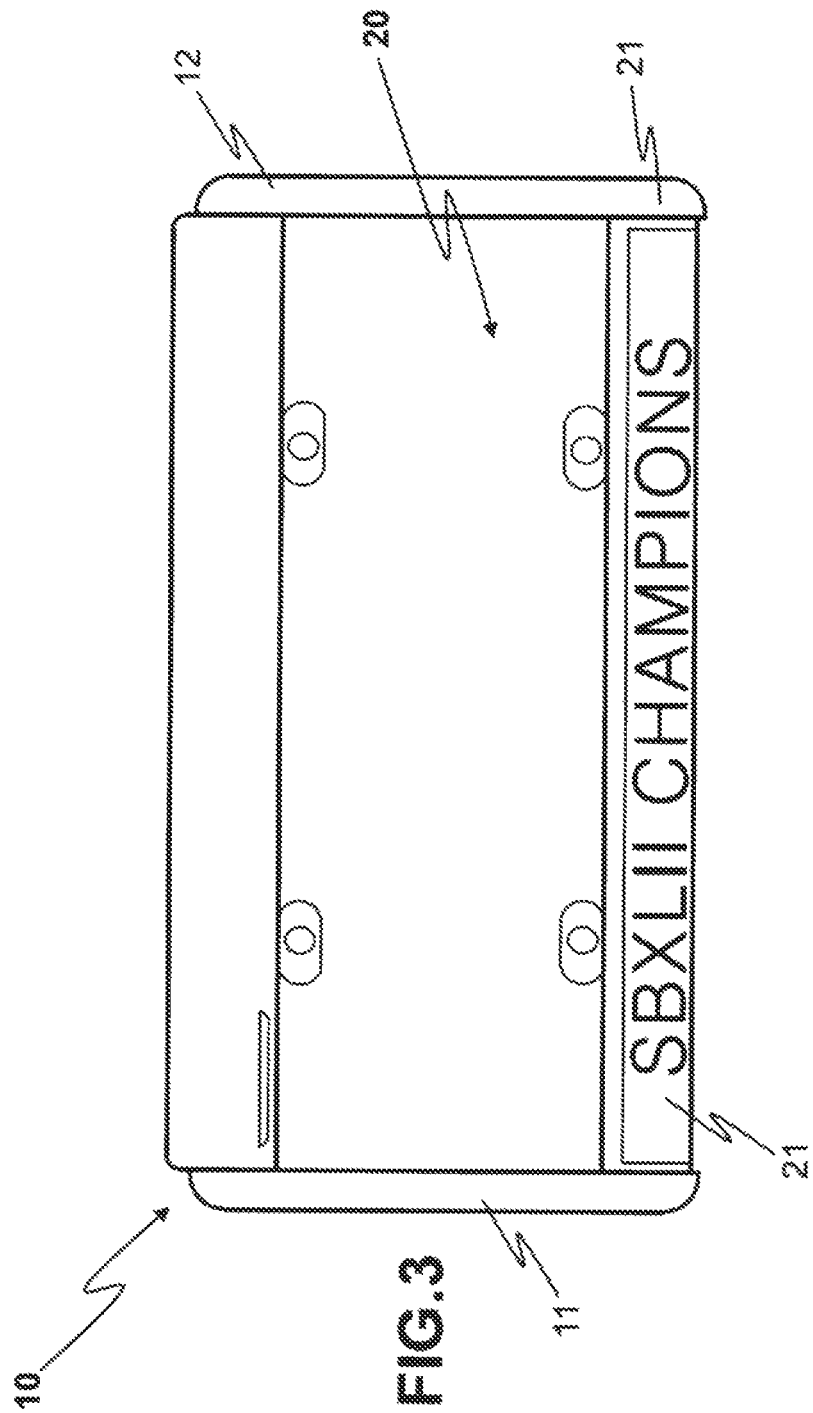
FIG. 3 is a front view of a message bar being inserted into the license plate holder of the present invention.
Figure 4:
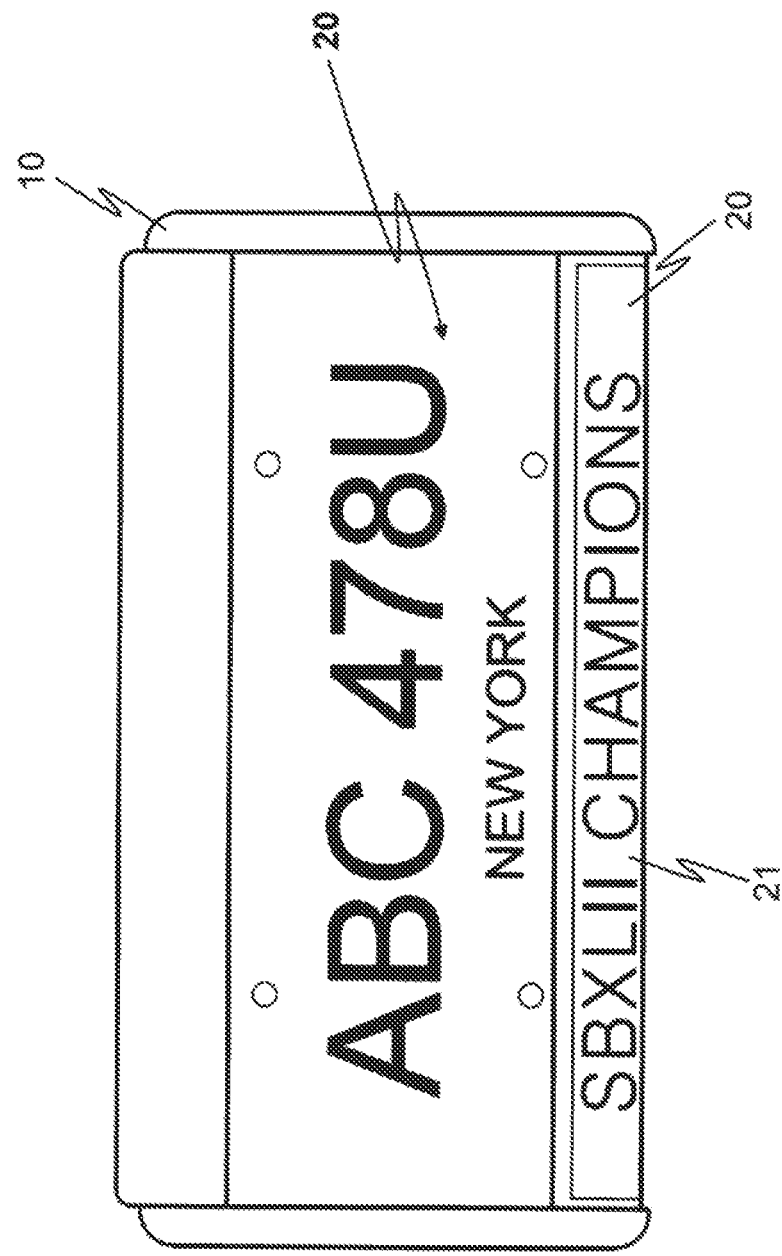
FIG. 4 is a front view of a license plate and the message bar being inserted into the license plate holder of the present invention.

Referring now to FIG. 1, there is shown a front view of a license plate holder 10 in accordance with an embodiment of the present invention. License plate holder 10 comprises a left and right ridge 11, 12 and a top and bottom horizontal bar 13, 14. Each of the left and right ridge 11, 12 has a front and a rear surface. The top and bottom horizontal bars 13, 14 are perpendicularly connected to the front surface of the left and right ridges 11, 12 to form a license plate holder 10 with window openings in the center 15, on the top 16 and bottom 17. A license plate and text/ad message bar 20 can be placed from the top opening into the space between the horizontal bars and the car's bumper when the license plate holder 10 is attached to the car. The top and/or bottom opening 16, 17 enable a personalized message bar 20 to be attached. The top and bottom opening 16, 17 allows the text/add message 21 on a text/add message bar 20 to be observed when a text/add message bar is inserted from the top or bottom open slot 16, 17 and, is secured by fastening means. FIG. 2 demonstrates a front view of a text/add message bar 20 located inside the license plate holder 10 wherein the text/add message 21 is observed through the bottom window opening 17. The central window opening 15 has a size similar to a license plate 30 so that when a license plate 30 is inserted from the top opening, the license plate can be viewed from the central window opening 15 as shown in FIG. 3. The fastening means to secure the message bar to the holder may be an arch 18 at the back of the holder. The present invention enables users to display various messages and ad bars around their license plate without having to permanently adhere the message or ad bar to their car.

The present invention comprises a license plate holder 10 that is designed to secure around the perimeter of a conventional license plate 30. In a first embodiment, the device utilizes a side slider message bar 20 that can be slidably positioned into the openings of the device, and be displayed on the vehicle. In an alternate embodiment, the message bars 20 can be placed into the license plate holder 10 with the use of multiple window openings on the top and bottom. In both embodiments, a plurality of indicia can be utilized with the present invention, that create a message bar containing letters, numbers, and symbols that can be installed therein.

The horizontal bars on the top 13 and bottom 14 include an attachment means for license plate holder 10 to a vehicle. In the preferred embodiment, the attachment means includes a pair of apertures 19 that allow threaded fasteners such as screws to pass through the frame, and to attach to the vehicle. The apertures 13 can be positioned either underneath or above the license plate, and can further secure the message or ad bar 20 to the license plate holder 10, license plate 30, and the car.

The message bar 20 can be inserted into the open slot 16 in the frame from the top, and then the license plate is inserted into the open slot 16 in the frame and positioned above the message bar 20. Then both message bar 20 and license plate 30 are secured to the holder by threaded fasteners. This embodiment is demonstrated by FIG. 3. The message bar 20 can easily be removed by a user, and a second message bar can be installed therein. This enables a user to change the message on his or her license plate holder without having to remove the entire license plate frame, and replace it with a new frame.

Figure 5:
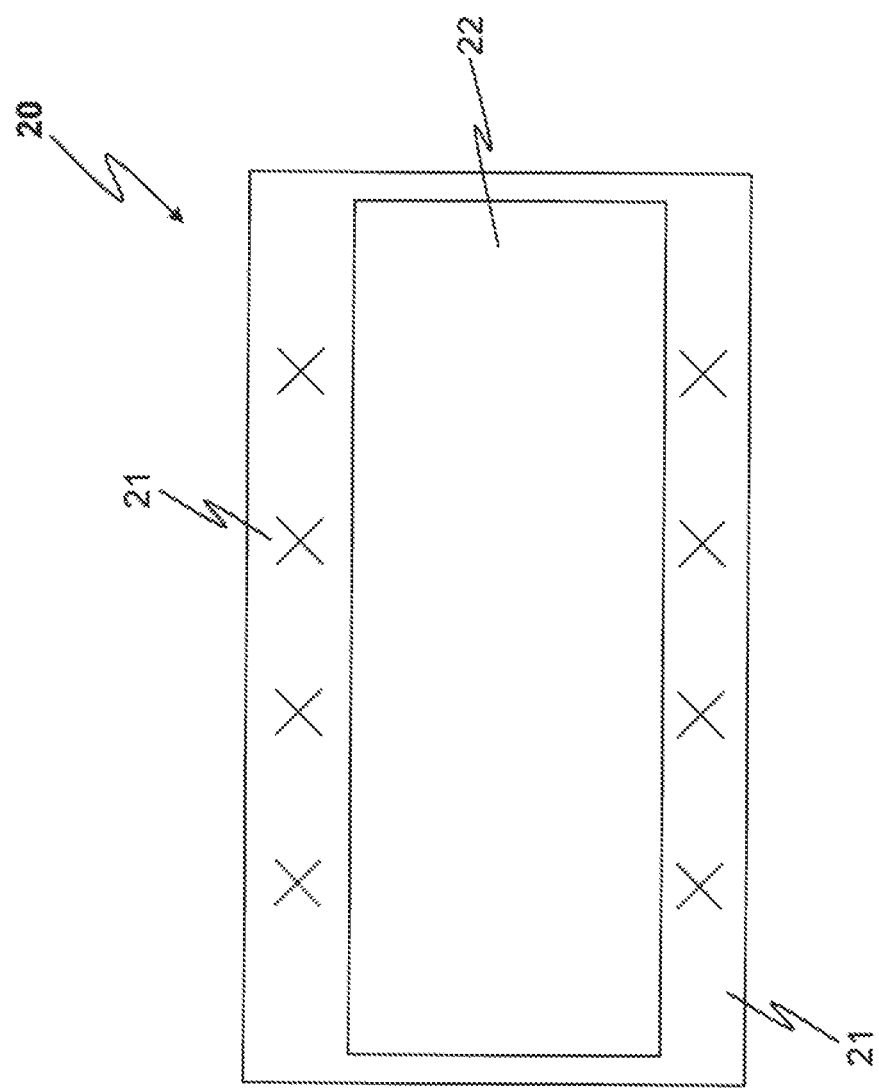
FIG. 5 is a front view of a message bar which has a central window opening for the license plate to be viewed.
Figure 6:
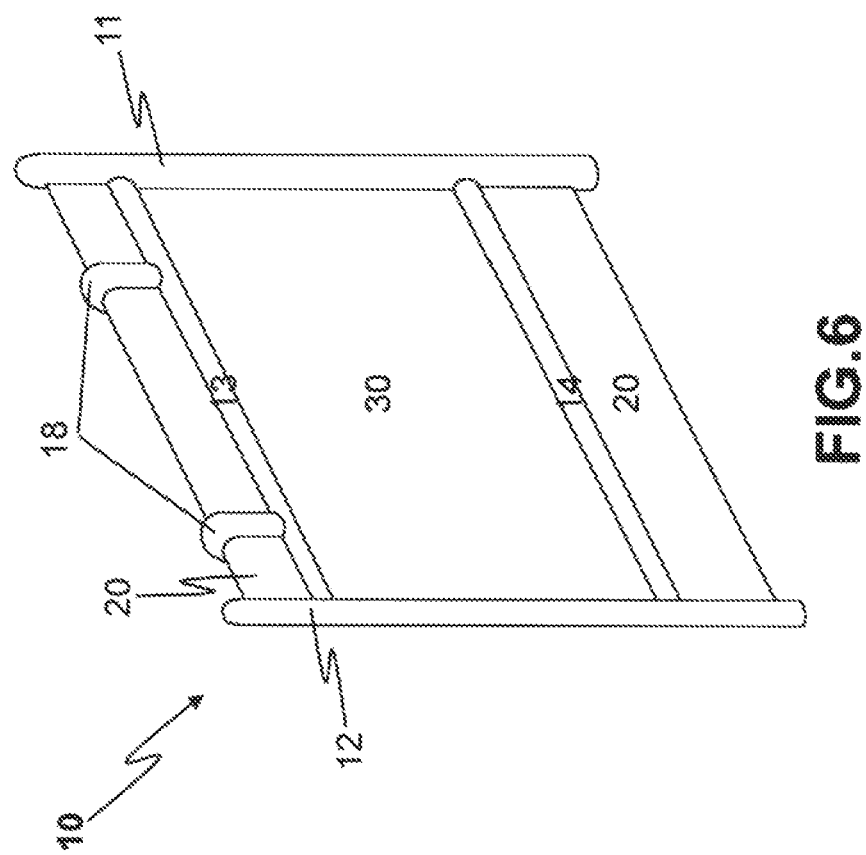
FIG. 6 is a rear view of a message bar and license plate being positioned into the license plate holder.

Alternatively, the license plate 30 can be inserted into the open slot 16 in the holder frame first, and is secured by fastening means 18, including but not limited to threaded fasteners such as a screw. Then the message bar 20 is inserted into the open slot 16 in the frame and positioned above the license plate 30 and is secured by an arch 18 at the back of the holder. In this embodiment, the message bar 20 has a window opening 22 in the center which has a size similar to the license plate (FIG. 5) so that the message 20 will not block the license plate 30. This embodiment facilitates change of message bars because the message bar 20 can be simply slide into the holder and secured between the license plate and the holder and secured by the arch 18 at the back of the license plate holder 10 (as shown in FIG. 6) without a need of screwing and unscrewing the threaded fastening means. In this way, the message bar 20 can easily be removed by a user, and a second message bar 20 can be installed therein. This enables a user to change the message on his or her license plate holder 10 without having to remove the entire license 30 and license plate holder 10, and re-installed them after the message bar 20 is replaced.

In this way, the present invention can provide users with a fun and a convenient way to display messages on their car's license plate holder. The device can allow people to personalize their vehicles without having to adhere a permanent bumper sticker.

In another embodiment said device can be formed to have an option wherein a top and bottom holder (either both or one or the other) can be used in a way which allows for them to be secured by side inserts to a frame or even without a frame as a standalone top or bottom that will have attached holes for a screw so that said device can be screwed together with the license plates themselves.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A customizable license plate holder for holding a license plate and text/ad message bar comprising:

left and right ridges;

top and bottom horizontal bars perpendicularly connected to the left and right ridges;

at least one text/ad message bar having indicia on at least one edge and having a window opening in the center which has a size similar to a license plate for the license plate to be viewed when the license plate is positioned behind the text/ad message bar; and attachment means for attaching the license plate holder to a car;

wherein the license plate holder has a plurality of window openings including but not limited to a central rectangular shaped window opening which has a size of a license plate such that when a license plate is inserted into the license plate holder the license plate can be viewed through the central window opening, and at least one opening at top or bottom such that when the text/ad message bar is inserted into the license plate holder the text/ad message indicia can be viewed through the top or bottom window openings;

wherein the attachment means are apertures located in the horizontal bars and threaded fasteners;

wherein the message bar can display a favorite quote, name of a sports team or team logos, or advertisements that marketers have requested or paid drivers to display.

* * * * *